Oct. 31, 1961 J. H. O. HARRIES 3,006,990

RADIO RECEIVERS EMPLOYING VISUAL DISPLAY SYSTEMS

Filed May 19, 1959

Inventor
John Henry Owen Harries
By Ralph B. Stewart
Attorney

United States Patent Office 3,006,990

Patented Oct. 31, 1961

3,006,990

RADIO RECEIVERS EMPLOYING VISUAL DISPLAY SYSTEMS

John Henry Owen Harries, Warwick, Bermuda, assignor to Harries Television Research Limited Filed May 19, 1959, Ser. No. 814,208
Claims priority, application Great Britain May 30, 1958
9 Claims. (Cl. 178—5.4)

Figures 1, 2:
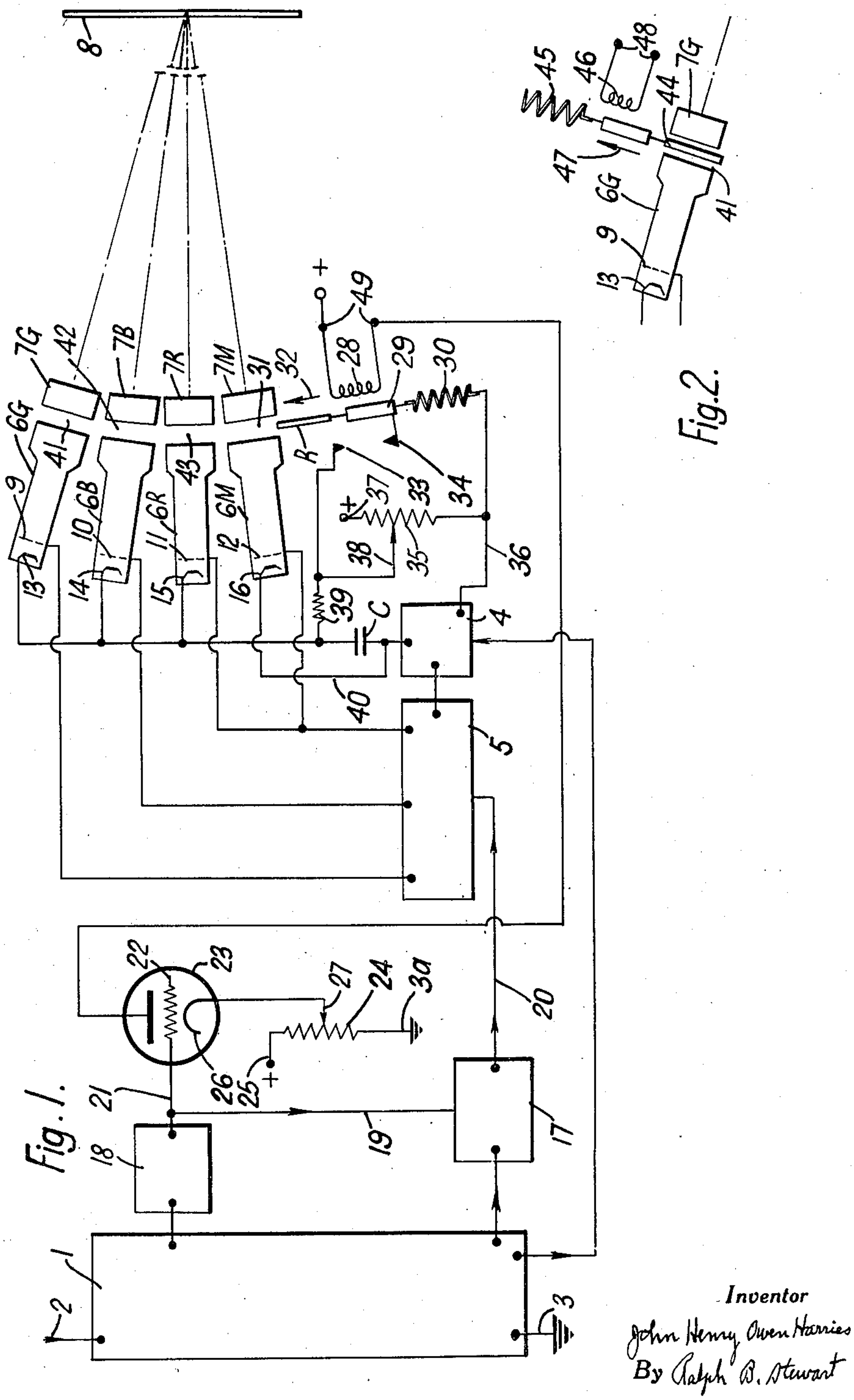

This invention relates to systems for the reception of television signals, including radar or other signals which can be applied to suitable display devices to produce a colour or monochrome visual display.

In those systems of colour television in which a suitable receiver can respond to both colour and monochrome picture signals to provide a corresponding picture on its display, the monochrome display being obtained by suitably balancing the relative luminances of the individual colour displays, a difficulty arises in the reception of monochrome signals. This difficulty is that, even though the colour balance of the colour reception may be good enough to be acceptable, yet an undesirable colouration may appear in the monochrome picture produced in the same receiver by the combination of the colour displays when a monochrome signal is received. Moreover, slight changes in colour balance which may occur from time to time during reception of a colour picture, but which are usually not noticeable in the colour picture itself, result in changes in the hue of the monochrome picture which are both noticeable and objectionable. In addition, the definition of a monochrome picture formed by the usual combination of the separate red, blue and green picture components produced by a receiver of the kind which is capable of reproducing a colour picture, is not as good as the definition of a monochrome picture produced by a receiver adapted to produce a monochrome picture only. Thus, in practice, monochrome reception on a compatible colour television receiver is not as satisfactory as monochrome reception on a monochrome receiver.

According to the invention, the apparatus comprises two or more display devices, at least one of which is adapted to produce a substantialy black-and-white display the remainder producing a colour display having all the required colour components, and optical projection systems whereby the displays produced by the said devices in response to incoming monochrome or colour signals are projected on to a common viewing screen to form monochrome or colour images. It also includes circuits means responsive to the presence or absence of a predetermined characteristic in an incoming colour or monochrome display signal for ensuring that during reception of a colour signal a colour filter is located in the light path between the display device for producing the black-and-white display and the viewing screen and that during reception of a monochrome signal the colour filter is absent from the light path, so that the latter display device, in addition to providing a black-and-white image on the viewing screen when a monochrome signal is received, reinforces a component colour image at the viewing screen when a colour signal is received.

It will be appreciated that because the monochrome display is produced as such and not by combining or superposing three colour pictures, the above-mentioned difficulties due to lack of colour balance when receiving monochrome signals are avoided.

The means responsive to the incoming signal to control the colour and monochrome display means may, for example, be controlled by the presence or absence of colour video signals in the transmission, or by the presence of a colour sub-carrier synchronising "burst" when a colour transmission in accordance with the "N.T.S.C." system is received.

The colour image at the viewing screen may be produced by the superposition of colour component images produced by a plurality of separate display devices, including the colour component image contributed by the combination of the colour filter and the display device adapted to provide a subtsantially black-and-white display, or it may be produced principally by a multiple colour display device, for example an electron discharge tube having a phosphor screen including elemental areas of different phosphors which radiate in different colours when excited.

In order that the invention may be better understood two embodiments will now be described with reference to the accompanying drawings, in which:

FIGURE 1 shows diagrammatically a television receiver embodying the present invention, and FIGURE 2 illustrates an alternative method of rendering the colour display devices inoperative when a monochrome signal is received.

FIGURE 1 shows an application of the invention to a receiver which is adapted for the reception of compatible colour and monochrome signals in accordance with the N.T.S.C. system. Television picture tubes 6G, 6B, 6R and 6M are respectively associated with optical systems 7G, 7B, 7R and 7M which project picture displays from the respective phosphor screens of the television picture tubes so that the projected images are superimposed on a common viewing screen 8. The cathode ray picture tube 6M and optical system 7M are adapted to produce a monochrome picture for viewing on the viewing screen 8. The picture tubes 6G, 6B, 6R and optical systems 7G, 7B and 7R are respectively adapted to produce green, blue and red components of a colour picture formed by the superposition of these three colour images on the viewing screen 8. The cathode ray picture tubes 6G, 6B, 6R, 6M include electron guns having cathodes 13, 14, 15 and 16 which are respectively associated with control grids 9, 10, 11 and 12. Block 1 represents part of a television receiver having an antenna 2 and ground connection 3. Luminance signals Y derived from the receiver are passed to circuits denoted by the block 4 from which they are applied directly to the cathode 16 of the monochrome cathode ray tube 6M. The luminance signals Y are also applied through a condenser C to the interconnected cathodes 13, 14 and 15 of the cathode ray tubes 6G, 6B and 6R. Chrominance signals from the receiver 1 are applied to a chrominance channel amplifier represented by the block 17, the output signals from which pass by way of the link 20 to demodulator circuits represented by the block 5. These circuits demodulate the chrominance subcarrier and provide the signals $-(G-Y)$, $-(B-Y)$, $-(R-Y)$ which are the signals which result, in suitable phase, after the subtraction of the luminance signal Y from each of the green, blue and red signals G, B and R respectively. The $-(G-Y)$, $-(B-Y)$ and $-(R-Y)$ signals are applied respectively to the control grid 9, the control grid 10 and to the two control grids 11 and 12 which are connected together.

It is usual in colour receivers used with the N.T.S.C. system to render inoperative or "kill" the chrominance channel of the receiver when monochrome is being received and to allow this chromince channel to become operative when colour is being received. A D.C. voltage is customarily generated in the receiver to perform this operation automatically. This D.C. voltage is typically produced by circuits including, for example, a quadricorrelator colour phase synchronising circuit; alternatively, it may be produced by rectification and integration of the amplified and limited burst signal used in the N.T.S.C. system. The circuits which provide this D.C. voltage are represented in FIGURE 1 by the block 18 and are fed with signals from the receiver 1 as shown. The D.C. voltage is fed by the link 19 to the chrominance channel amplifiers which are indicated by the block 17 and is utilised therein to render the chrominance channel of the receiver inoperative when monochrome is received and operative when colour is received in the usual manner. During colour reception, but not during monochrome reception, the block 17, therefore, feeds the chrominance signals to the block 5 by way of the link 20 and the $-(G-Y)$, $-(B-Y)$ and $-(R-Y)$ signals are fed to the control grids 9, 10, 11 and 12, respectively, of the cathode ray tubes.

In the system shown in FIGURE 1 the above-mentioned D.C. voltage is used not only for the colour "killer" circuit, but also for the purposes of the present invention. It is applied by way of the link 21 to the control grid 22 of a triode valve 23. A potentiometer 24 is connected at one end to ground and at the other end 25 to a source of positive potential, and has its slider 27 connected to the cathode 26 of the valve 23. An adjustable positive bias is thus applied to the cathode 26.

The D.C. voltage applied to the grid 22 of the valve 23 has a greater positive potential when a colour picture signal is being received and, assuming that the slider 27 is properly set, the anode current of the valve 23 will increase from a very low to a relatively high value. This increased anode current passes through the energising coil 28 of a solenoid. A red colour filter R is attached to the armature 29 of the solenoid mechanism. This red filter R and armature 29 are constrained by a helical spring 30 so that when the coil 28 is not energised the red filter R is withdrawn from a gap 31 between the tube 6M and the projection unit 7M, and monochrome light reaches the viewing screen 8 from the cathode ray tube 6M. When the coil 28 is energised upon receipt of a colour signal the red filter moves in the direction of the arrow 32 and into the gap 31 and a red image of the display on the screen of the tube 6M is produced at the viewing screen. A contact 34 is attached to the armature 29 so that it makes electrical connection with a contact 33 when the red filter R is in the gap 31. The contacts are open, as shown in FIGURE 1, when this filter is not in the gap. The cathode 16 of the cathode ray tube 6M is connected in the block 4 to a steady biasing potential. The contact 34 is connected through the spring 30 and the link 36 to the same steady potential in the block 4. The potentiometer 35 is connected between the link 36 and a source 37 of positive potential, and has its slider 38 directly connected to the contact 33 and connected through a high resistance 39 to the cathodes 13, 14 and 15 of the cathode ray tubes 6G, 6B and 6R.

When, during reception of a colour signal, the coil 28 is energised and the red filter is inserted into the space 31 (so that red light reaches screen 8 from the cathode ray tube 6M), the contacts 33 and 34 are closed and the biasing potential on the cathodes 13, 14 and 15 of the colour component tubes is the same as that of the cathode 16 of the monochrome tube. As a result, green, blue and red light reaches the screen 8 from the cathode ray tubes 6G, 6B and 6R, respectively. The Y signal is applied to the cathodes 13, 14, 15 and 16, and the signals $-(G-Y)$, $-(B-Y)$ and $-(R-Y)$ are applied respectively to the control grid 9, the control grid 10 and the interconnected control grids 11 and 12. Hence a composite colour picture is produced on the screen 8. The red light from the cathode ray tube 6R is supplemented at the screen by the red light produced by the combination of the cathode ray tube 6M and the red filter R. This tends to overcome the relatively low luminance efficiency of red cathode ray tube phosphors.

On the other hand, when a monochrome signal is being received the coil 28 is not energised and the red filter R is withdrawn from the gap. A monochrome image is projected on to the screen 8 from the cathode ray tube 6M. The contacts 33 and 34 are open and, assuming that the slider 8 on the potentiometer 35 is appropriately set, the cathodes 13, 14 and 15 are biased positively by an amount sufficient to render the colour component cathode ray tubes 6G, 6B and 6R inoperative, so that no light reaches the screen 8 from these tubes.

The appropriate colour balance needed for reproducing the colour picture may be attained by suitable adjustments of the drive potentials applied to the cathodes 13, 14, 15 and 16, and to the control grids 9, 10, 11 and 12, and by an appropriate choice of the steady potentials applied to the electrodes of the cathode ray tubes, in known manner. In the preferred embodiment of the invention, however, colour balance is attained by the use of apertured plates to control the amount of green and blue light reaching the viewing screen 8 from the cathode ray tubes 6G and 6B, as disclosed in our co-pending application Ser. No. 757,520. In addition, if the distortion resulting from the oblique projection of the images on to the screen 8 is found to be excessive, it can be substantially overcome by means of the distortion correction device disclosed in our co-pending U.S. application Serial No. 814,206. In the apparatus described above the deflection potentials applied to the cathode ray tubes are responsible for both the line and the frame scanning. If desired, however, the frame scanning can be achieved by means of a rotating or oscillating mirror which reflects on to a viewing screen light from the single-line displays on the tube faces, as described in our co-pending application Serial No. 665,884, filed June 17, 1957, now abandoned. In this case, each cathode ray tube need have only a line of phosphor on its screen.

In an alternative embodiment the solenoid coil 28 in FIGURE 1 may be energised not by the anode current of the valve 23, which is omitted, but by that of another valve in the receiver the anode current of which increases when the colour signal is being received. Such a valve may, for example, be one of the chrominance amplifier valves.

Instead of rendering the cathode ray tubes 6G, 6B and 6R in FIGURE 1 inoperative when a monochrome signal is being received by applying a positive bias to the cathodes 13, 14 and 15, these tubes may be prevented from projecting component colour pictures on to the screen 8 by inserting into each of the gaps 41, 42 and 43 an opaque masking plate which shuts off light from the corresponding tube which would otherwise travel to the screen 8. In FIGURE 2 one such masking plate 44 is shown in the position in which it cuts off the light which would otherwise travel from the cathode ray tube 6G to the optical projection system 7G. The helical spring 45 is arranged to insert the opaque mask 44 into the gap 41 unless the coil 46 is energised. When it is energised the opaque mask 44 is withdrawn from the gap in the direction of the arrow 47, against the spring 45, so that light from the tube 6G passes to the screen. In applying this modification to the circuit of FIGURE 1 the contacts 33 and 34, the potentiometer 35 and resistor 39 are omitted and a direct connection is substituted for the condenser C. The terminals 48 of the energising coils 46, one of which is shown in FIGURE 2, are connected across the terminals 49 of the energising coil 28 in FIGURE 1.

When a colour signal is received, and the coil 28 and the coils 45 of the respective masks are energised by the increased anode current of the valve 23, and the opaque masks 44 are withdrawn from the gaps 41, 42 and 43 in front of the cathode ray tubes 6G, 6B and 6R so that these tubes are operative to produce colour component images at the viewing screen. At the same time the red filter R is inserted into the gap 31 as already explained, so that the cathode ray tube 6M contributes a red image at the screen 8.

When a monochrome picture is being received the coils 28 and 46 are all energised by the anode current from the valve 23, the opaque masks 44 are inserted in the gaps 41, 42 and 43 so that the cathode ray tubes 6G, 6B and 6R are rendered inoperative; at the same time the red filter R is withdrawn from the gap 31 so that the cathode ray tube 6M produces a substantially black-and-white display and a corresponding image upon the screen 8.

I claim:

1. Apparatus for the reception of electric signals representing colour and monochrome visual displays, comprising at least two display devices, at least one of which is adapted to produce a substantially black-and-white display, the remainder being adapted to produce a colour display having all the colour components, a colour filter associated with the said black-and-white display device, a common viewing screen, optical projection systems for projecting the displays produced by said devices in response to incoming monochrome and colour display signals on to said viewing screen to form either monochrome or colour images, and circuit means responsive to said signals for providing a central signal representing the presence or absence of a predetermined characteristic in an incoming display signal, and filter control means controlled by said circuit means whereby during reception of a colour signal said colour filter is located in the light path between said display device for producing the black-and-white display and said viewing screen and that during the reception of a monochrome signal said colour filter is absent from the light path, whereby the latter display device provides a black-and-white image on a screen when a monochrome signal is received and reinforces one of the component colour images at said viewing screen when a colour signal is received.

2. Apparatus according to claim 1, comprising in addition to said black-and-white display device a plurality of display devices contributing colour component images to said colour display on said common viewing screen, said colour filter allowing to pass light of substantially the same colour as the display produced by one of said colour-component display devices.

3. Apparatus according to claim 1, including an opaque mask for each display device for producing a colour display, and means responsive to the presence or absence of said predetermined characteristic in an incoming signal for inserting an opaque mask between said viewing screen and each of said colour display devices when a monochrome signal is received.

4. Apparatus according to claim 1, in which said display devices are electron discharge picture tubes, at least one of said tubes being adapted to produce a colour display and being rendered inoperative when a monochrome signal is received by the application of a biasing potential to said colour tube.

5. Apparatus according to claim 4, including a mechanical device for displacing said colour filter and which is provided with contacts controlling said biasing potential.

6. Apparatus according to claim 1, in which said circuit means is adapted to produce a D.C. biasing potential in response to the colour burst signal of the N.T.S.C. compatible colour and monochrome signal.

7. Apparatus for the reception of electric signals representing colour and monochrome visual displays, comprising at least two display devices in the form of electron discharge tubes of the kind including a phosphor screen for the production of a visual display, at least one of said tubes having a phosphor screen which, when excited, produces a substantially black-and-white display, the remaining tubes having phosphor screens providing all the component colours necessary to produce a color image on the viewing screen, a colour filter associated with said black-and-white display device, a common viewing screen, optical projection systems arranged to project the displays produced by said tubes on to said viewing screen to form monochrome and colour images, circuit means responsive to said signals for providing a control signal representing the presence or absence of a predetermined characteristic of one of said electric signals, and control means connected to receive said control signal and operatively associated with said colour filter for placing said filter in the light path between said viewing screen and said electron discharge tube with the black and white phosphor when a colour signal is received, and removing said colour filter from the said light path when a monochrome signal is received, whereby the latter tube, in addition to providing a black-and-white display on said viewing screen when a monochrome signal is received, serves in combination with said colour filter to reinforce the red colour component of the colour display provided by said remaining tube or tubes at said viewing screen when a colour signal is received.

8. Apparatus according to claim 7, including four electron discharge tubes three of which have phosphor screens for producing red, blue and green displays and the fourth of which has a phosphor screen for producing a substantially black-and-white display and which apparatus includes a removable red filter associated with its optical projection system, said red filter being in place and said black-and-white phosphor being excited by the red component signal when a colour signal is received.

9. Apparatus according to claim 7, in which one of the display devices is an electron discharge tube having a display screen consisting of a plurality of small areas constituting different sets of areas on which are provided phosphors adapted to radiate in different colours, whereby the said tube provides at the viewing screen an image including all the component colours required for the colour display.

References Cited in the file of this patent

UNITED STATES PATENTS

| | | |
|---|---|---|
| 2,803,698 | De Vrijer | Aug. 20, 1957 |
| 2,839,599 | Epstein | June 17, 1958 |
| 2,858,367 | Rhodes | Oct. 28, 1958 |
| 2,885,464 | Loughlin | May 5, 1959 |